(12) United States Patent
Chen

(10) Patent No.: US 7,927,131 B2
(45) Date of Patent: Apr. 19, 2011

(54) BATTERY CONNECTOR WITH CONTACT TERMINAL HAVING IMPROVED RETAINING FORCE

(75) Inventor: De-Jin Chen, ShenZhen (CN)

(73) Assignee: Hon Hai Precision Ind. Co., Ltd., New Taipei (TW)

( * ) Notice: Subject to any disclaimer, the term of this patent is extended or adjusted under 35 U.S.C. 154(b) by 137 days.

(21) Appl. No.: 12/316,513

(22) Filed: Dec. 12, 2008

(65) Prior Publication Data

US 2009/0156052 A1 Jun. 18, 2009

(51) Int. Cl.
*H01R 3/00* (2006.01)

(52) U.S. Cl. ........................................... 439/500

(58) Field of Classification Search .................. 439/500, 439/96–100; 361/801, 760, 761
See application file for complete search history.

(56) References Cited

U.S. PATENT DOCUMENTS

| 5,931,693 | A | 8/1999 | Yamazaki |
| 7,335,051 | B2 | 2/2008 | Chen et al. |
| 7,390,215 | B2 | 6/2008 | Liao et al. |

FOREIGN PATENT DOCUMENTS

| TW | 239602 | 1/1995 |
| TW | 291187 | 11/1996 |
| TW | 355093 | 3/1999 |

OTHER PUBLICATIONS

U.S. Appl. No. 11/999,435, Zhang et al.
U.S. Appl. No. 12/217,179, Chen et al.
U.S. Appl. No. 12/217,188, Chen et al.

*Primary Examiner* — Alexander Gilman
(74) *Attorney, Agent, or Firm* — Wei Te Chung; Andrew C. Cheng; Ming Chieh Chang

(57) ABSTRACT

A battery connector adapted to hold a battery, comprises an insulative housing, a first conductive contact and a second conductive contact. The insulative housing defines a receiving chamber which having a horizontal bottom. The first conductive contact comprises a retention portion retained in the periphery of the receiving chamber, a resilient portion extending in a horizontal direction from the retention portion and pivotal about an axis of the retention portion along a vertical direction, a hook portion extending from a distal end of the resilient portion, and a spring arm extending from a location adjacent the distal end of the resilient portion. The second conductive contact is disposed in the bottom and having a resilient contacting portion for electrically engaging with the battery.

17 Claims, 6 Drawing Sheets

BATTERY CONNECTOR WITH CONTACT TERMINAL HAVING IMPROVED RETAINING FORCE

BACKGROUND OF THE INVENTION

1. Field of the Invention

The present invention relates to an electrical connector, and in particularly to a battery connector having improved retaining force.

2. Background of the Invention

Disk-shaped cells or batteries are often used as back up protection for electronic equipment should there be a failure in the conventional power system. Typically, these disk-shaped backup cells are relatively small, having, for example, a diameter of about 0.268 inches and a thickness of about 0.083 inches. The cell has a positive electrode extending along a major surface and the edge and a negative electrode extending over the other major surface and isolated from the positive electrode. For purposes of this invention the term "battery" is to be understood to include a single cell. The battery is inserted into a connector mounted to a circuit board, the connector hereinafter being referred to as a "battery connector". It is desirable that a backup battery connector be easy to mount to the circuit board, be readily accessible for replacing a depleted battery, and be cost effective to manufacture.

Taiwan Patent No. 291187 (referred to as the '187 patent for short) issued on Nov. 11, 1996 discloses a battery connector for holding a coin battery therein. Referring to FIGS. 1 to 5 in the '187 patent, the battery connector in which the coin battery 20 is retained includes an insulative battery holder 10 and a positive contact 14 vertically received in a bottom near a side of the insulative battery holder 10. The positive contact 14 has a fastener 15 disposed at a side of a slightly upper portion thereof and extending inwardly. The fastener 15 has a sloped surface in a top edge thereof, and a protruding tab 16 extending outwardly is connected with a top end of the fastener 15. The positive contact 14 includes a resilient tab 17 disposed a back side thereof and extending outwardly for leaning against a blocking wall 12 of the insulative battery holder 10. Especially with reference to FIG. 5, when the battery 20 is removed from the battery connector, it is required to pull the protruding tab 16 outwardly by hand, whereby the battery 20 is disengaged from the fastener 15. Because the positive contact extends in a vertical direction and it is necessary to control a whole height of the battery connector, the positive contact 14 can't be longer so that deformation of the positive contact is focused on a small scope, thereby causing stress of the positive contact to be concentrated overly and further causing the positive contact is easily subject to be deformed permanently. Furthermore, a distal end of the resilient tab 17 is against the bottom of the insulative battery holder so as to restraint deformation of a lower portion of the positive contact, whereby stress of the positive contact is further concentrated in a smaller scope of an upper portion of the positive contact, possibly resulting in breakage of the positive contact due to excess deformation.

It is thus desirable to provide a battery connector that alleviates and even overcomes the above disadvantages.

SUMMARY OF THE INVENTION

An object of the present invention is to provide a battery connector having a low profile.

Another object of the present invention is to provide a battery connector having a positive contact which has a good elasticity so as to be difficult to permanent deformation and can provide an enough retention force.

An aspect of the present invention provides a battery connector adapted to hold a battery, comprises an insulative housing, a first conductive contact and a second conductive contact. The insulative housing defines a receiving chamber which having a horizontal bottom. The first conductive contact comprises a retention portion retained in the periphery of the receiving chamber, a resilient portion extending in a horizontal direction from the retention portion and pivotal about an axis of the retention portion along a vertical direction, a hook portion extending from a distal end of the resilient portion, and a spring arm extending from a location adjacent the distal end of the resilient portion. The second conductive contact is disposed in the bottom and having a resilient contacting portion for electrically engaging with the battery. Wherein, the hook portion is adapted to elastically urge an upper corner of a battery received in the receiving chamber while the spring arm deformed with a distal end of the spring arm supported on a vertical wall of the insulative housing.

The battery connector according to the embodiment of the present invention has the resilient portion extending in a horizontal direction, so the extending length of the resilient portion will not increase height of the battery connector, thereby satisfy the design requirement of low profile feature. In comparison with the conventional resilient portion extending upwardly, the resilient portion of the first conductive contact according to the present invention may have a longer length, thereby making for dispersing stress to reduce the possibility of permanent deformation of the first conductive contact. In addition, the resilient portion has the spring arm extending apart from the center of the receiving chamber and the free end of the spring arm is against the insulative housing of the battery connector, which can further disperse stress and increase elasticity of the first conductive contact.

BRIEF DESCRIPTION OF THE DRAWINGS

Hereinafter, the above, other objects and advantages will become more apparent from the following description for embodiments of the present invention with reference to accompanying drawings.

DETAILED DESCRIPTION OF THE EMBODIMENTS

Hereinafter, in order to make the above objects, features and advantages to be easily understood, embodiments of the present invention will be described in detail with reference to the accompanying drawings.

Figure 1:
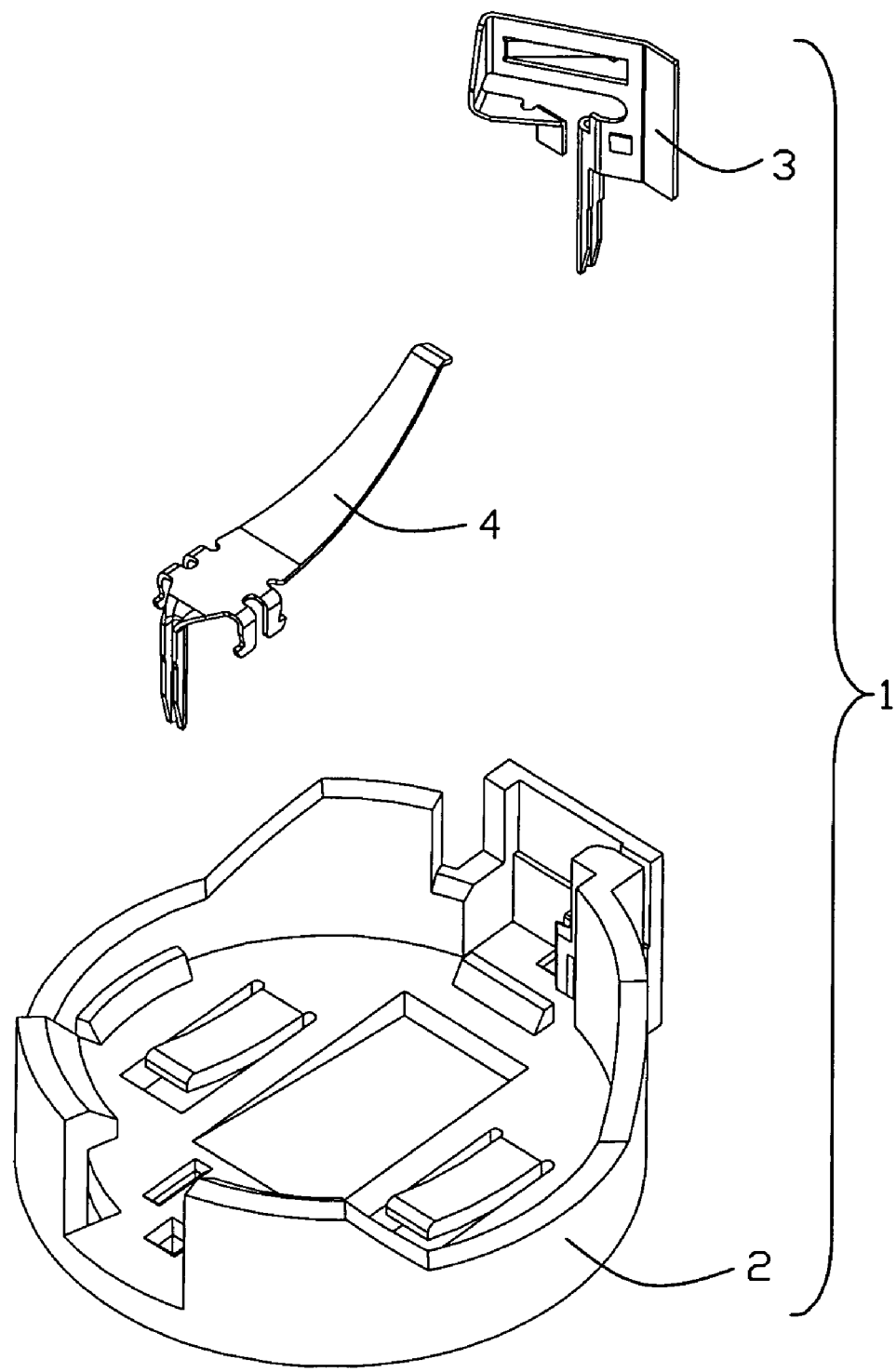
FIG. 1 is a exploded, perspective view of a battery connector in accordance with the present invention.
Figure 2:
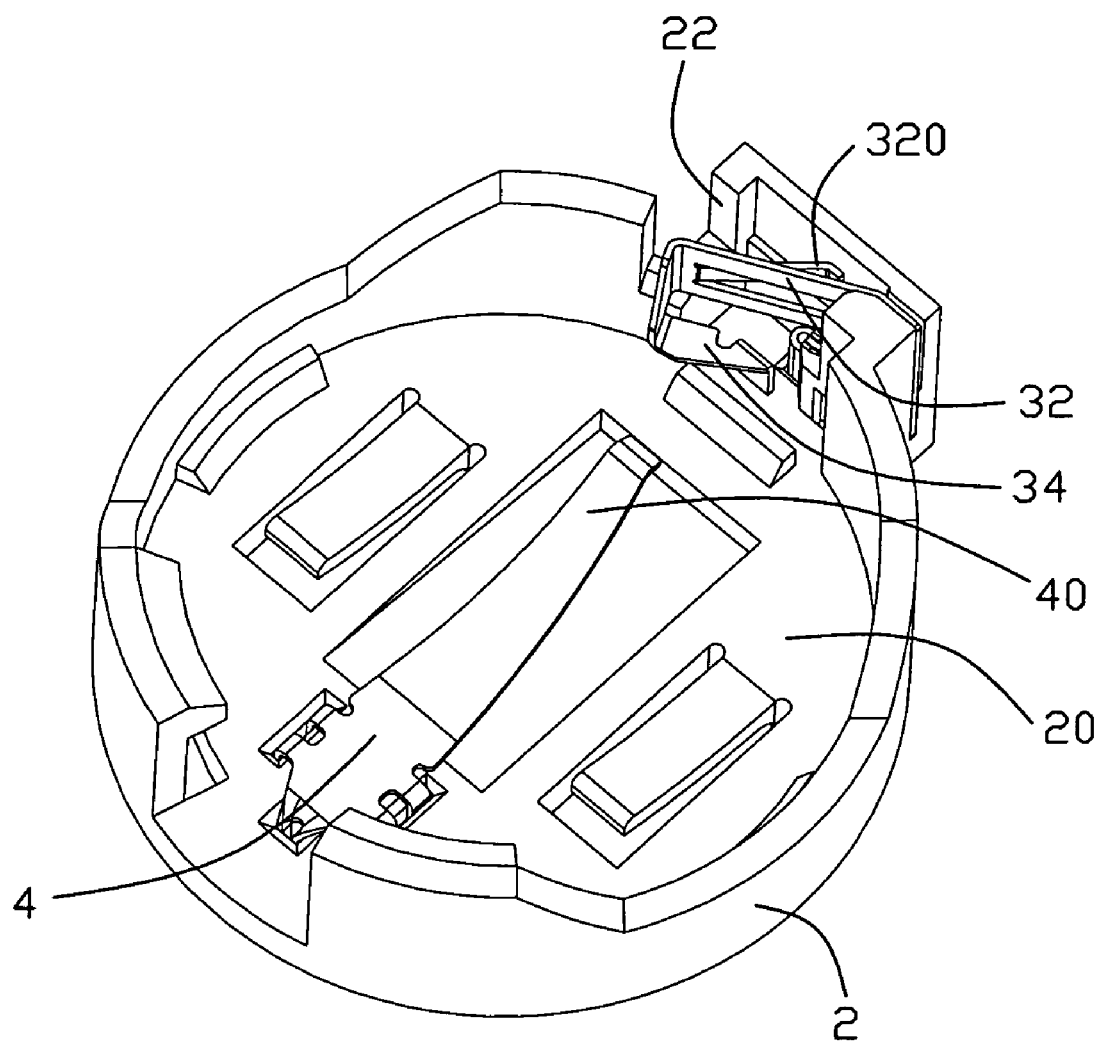
FIG. 2 is an assembled, perspective view of the battery connector of FIG. 1.
Figure 3A:
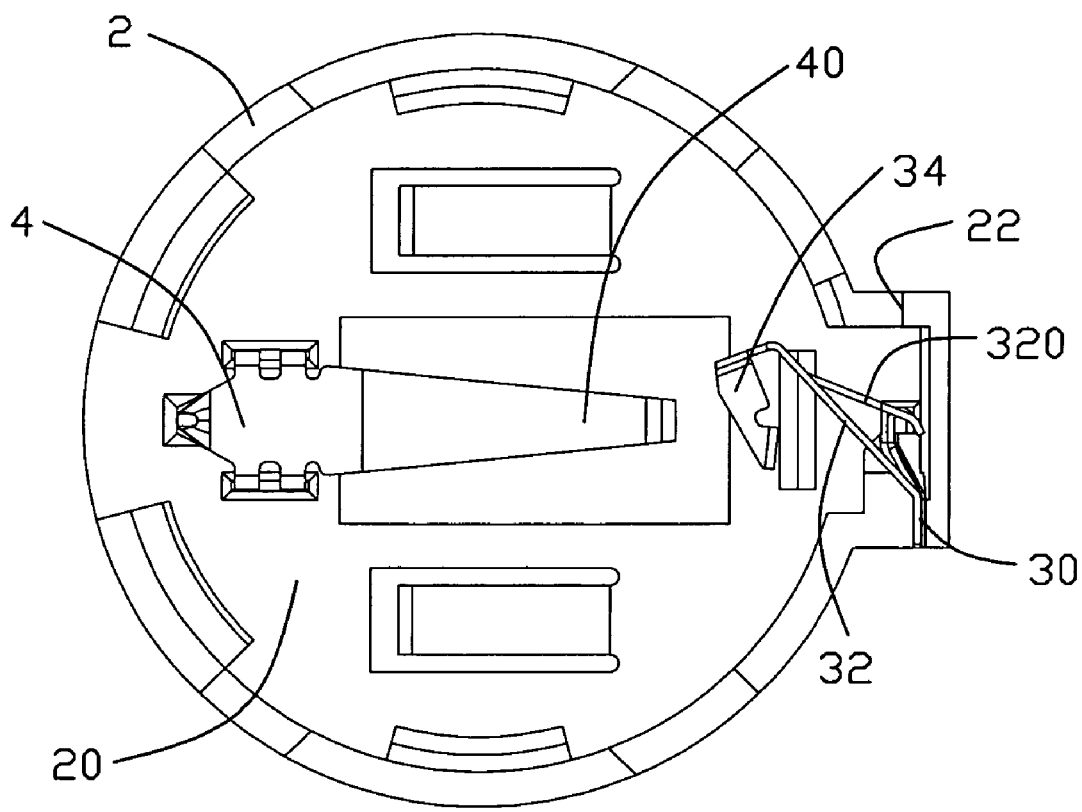
FIG. 3A is a top view of the battery connector of FIG. 1.
Figure 3B:
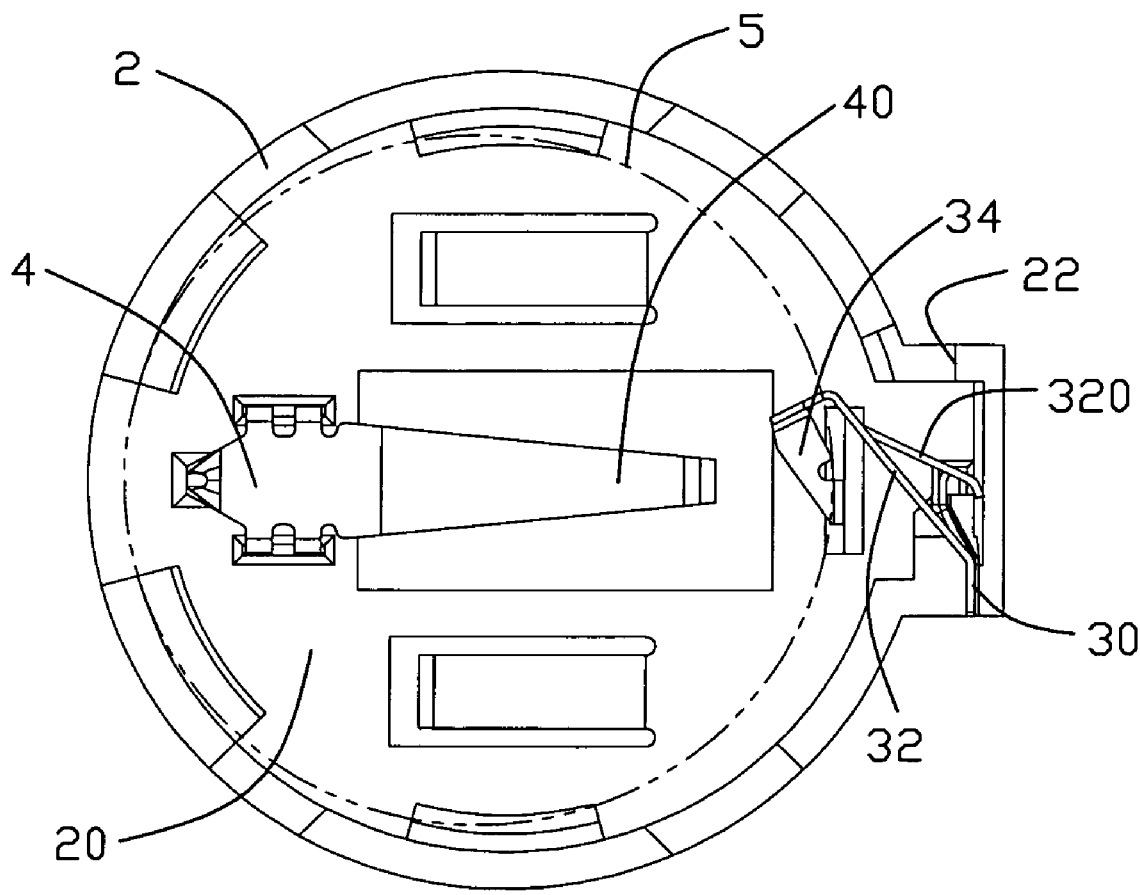
FIG. 3B is a top view of the battery connector of FIG. 1, a battery retained in the receiving chamber of the battery connector.

With reference to FIGS. 1 to 3, a battery connector 1 in accordance with the present invention comprises an insulative housing 2, a first conductive contact 3 and a second conductive contact 4. The insulative housing defines a receiving chamber 20 for holding a battery therein. The second conductive contact 4 is positioned in a bottom of the receiving chamber 20 and has a resilient contacting portion 40 extending in a slant and upward direction.

Figure 4:
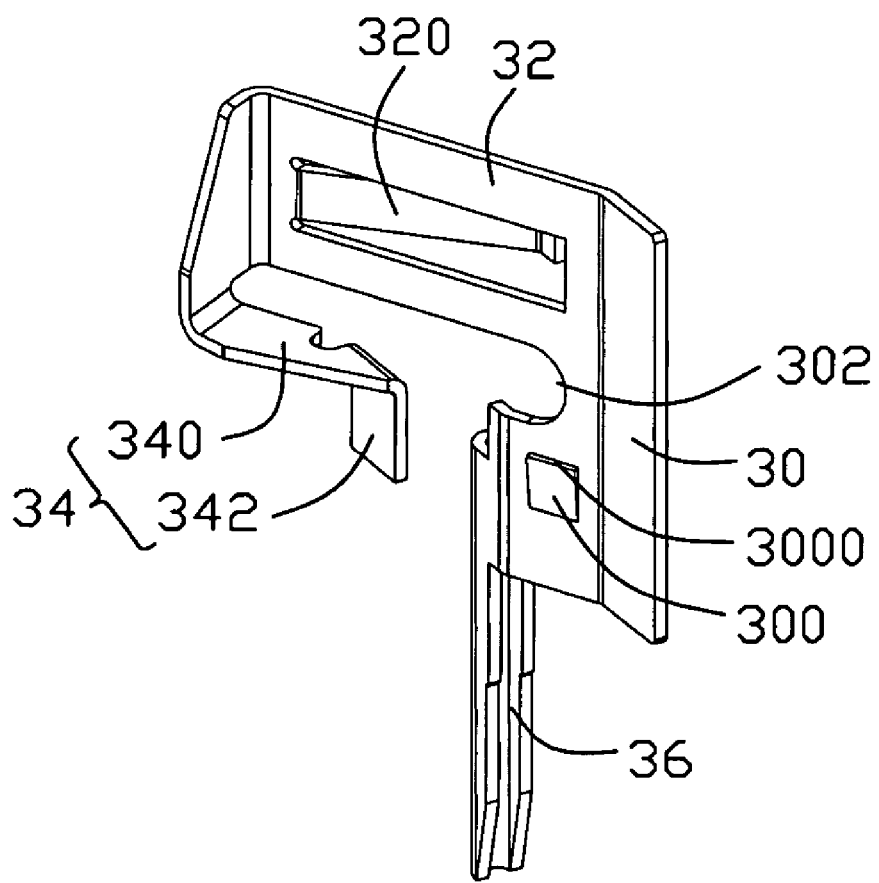
FIG. 4 is a perspective view of a first conductive contact of the battery connector of FIG. 1.
Figure 5:
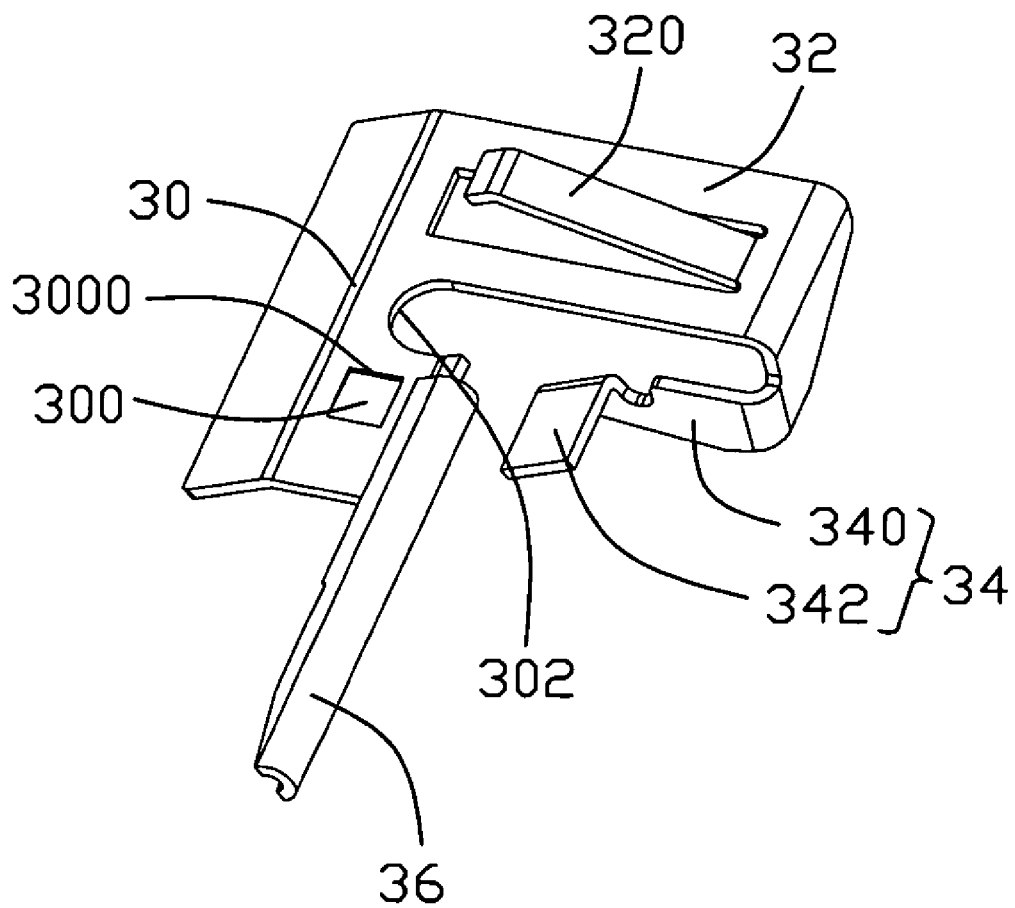
FIG. 5 is a perspective view of the first conductive contact similar to FIG. 4 but taken from a different perspective.

In conjunction with FIGS. 4 and 5, the first conductive contact 3 is stamped from a metal sheet and comprises a retention portion 30 retained in the periphery of the receiving chamber 20 of the insulative housing 2, a resilient portion 32 extending traverse from one side of the retention portion 30, a hook portion 34 extending from a distal end of the resilient portion 32 toward the receiving chamber 20, and a mounting leg 36 extending downwardly from the retention portion 30 beyond a bottom surface of the insulative housing 2 for being mounted onto a printed circuit board (not shown) to establish an electrical connection between the battery connector and the printed circuit board.

Because the resilient portion 32 extends in a horizontal direction, the extending length of the resilient portion can't increase height of the battery connector 1, thereby satisfy the design requirement of the battery connector 1 having a low profile. In addition, in comparison with the conventional resilient portion extending upwardly, the resilient portion 32 of the first conductive contact 3 according to the present invention may have a longer length, thereby making for dispersing stress to reduce the possibility of permanent deformation of the first conductive contact 3. The resilient portion 32 can be rotated relative to the retention portion 30 as an axis with a straight line located in a conjunction of the resilient portion 32 and the retention portion 30 and perpendicular to a bottom surface of the receiving chamber 20.

The insulative housing 2 has a stopper 22 disposed in a rotated range of the resilient portion 32. The stopper 22 may be provided to restrict movement of the resilient portion 32 for assuring the resilient portion 32 is rotated without exceeding a maximum deformed range and preventing the resilient portion 32 from being destroyed due to excess deformation.

The hook portion 34 comprises a first hook portion 340 facing a bottom of the receiving chamber 20 for elastically urging an upper corner of a battery 5 received in the battery connector 1 toward the bottom of the receiving chamber and a second hook portion 342 extending downwardly from one side of the first hook portion 340 and facing a center of the receiving chamber 20 for elastically urging a side wall of the battery toward the center of the receiving chamber 20 to hold the battery tightly. The first hook portion 340 can prevent the battery 5 from being moved upwardly, and the second hook portion 342 can prevent the battery 5 from being moved sideward.

The resilient portion 32 has a spring arm 320 extending apart from the center of the receiving chamber 20. The spring arm 320 extends from a location near a free end of the resilient portion 32 and a free end of the spring arm 320 is against the insulative housing 2 for dispersing stress and increasing elasticity of the first conductive contact 3.

The retention portion 30 of the first conductive contact 3 includes a retaining projection 300 having a guiding slope in a lower thereof and a locking surface 3000 in a top thereof for engaging with the insulative housing 2 to secure the first conductive contact 3 in the insulative housing 2.

The resilient portion 32 has a plane perpendicular to the bottom surface of the receiving chamber and a rectangular metal sheet is stamped from a middle of the plane to form the spring arm 320. An arc cutout 302 is formed in a lower end of the conjunction of the resilient portion 32 and the retention portion 30, and a top end of the resilient portion 32 of the first conductive contact 3 is level with that of the retention portion 30, so that the conjunction of the resilient portion 32 and the retention portion 30 can be transmitted smoothly for prevent the first conductive contact 3 from being destroyed due to concentration of part stress.

When the receiving chamber 20 holding a battery 5 therein, the hook portion 340 is pushing the battery 5 giving a traverse force toward a center of the receiving chamber 20 and a downward force toward the bottom, the spring arm 320 is deformed with a distal end of the spring arm 320 support on a vertical wall of the insulative housing 2.

The forgoing descriptions disclose the embodiments of the present invention but do not intend to limit the present invention. Additional advantages and modifications will readily occur to those skilled in the art. Therefore, the invention in its broader aspects is not limited to the specific details and representative embodiments shown and described herein. Accordingly, various modifications and variations may be made without departing from the scope of the invention as defined by the appended claims and their equivalents.

What is claimed is:

1. A battery connector adapted to hold a battery, comprising:
   an insulative housing defining a receiving chamber which having a horizontal bottom;
   a first conductive contact comprising a retention portion retained in the periphery of the receiving chamber, a resilient portion extending in a horizontal direction from the retention portion and pivotal about an axis of the retention portion along a vertical direction, a hook portion extending from a distal end of the resilient portion, and a spring arm extending from a location adjacent the distal end of the resilient portion; and
   a second conductive contact disposed in the bottom and having a resilient contacting portion for electrically engaging with the battery;
   wherein, the hook portion is adapted to elastically urge an upper corner of the battery received in the receiving chamber while the spring arm is deformed with a distal end of the spring arm supported on a vertical wall of the insulative housing.

2. The battery connector according to claim 1, wherein the hook portion of the first conductive contact comprises a first hook portion facing a bottom of the receiving chamber and a second hook portion facing a center of the receiving chamber.

3. The battery connector according to claim 2, wherein the resilient portion has a spring arm extending from a location near a free end of the resilient portion and a free end of the spring arm is against the insulative housing.

4. The battery connector according to claim 3, wherein the insulative housing has a stopper disposed in a rotated range of the resilient portion for restricting movement of the resilient portion.

5. The battery connector according to claim 4, wherein the first conductive contact further comprises a mounting leg extending downwardly from the retention portion beyond a bottom surface of the insulative housing.

6. The battery connector according to claim 5, wherein the resilient portion has a plane perpendicular to the bottom surface of the receiving chamber, and the spring arm is stamped from a middle of the plane and extends from a location near a free end of the resilient portion.

7. The battery connector according to claim 6, wherein an arc cutout is formed in a lower end of the conjunction of the resilient portion and the retention portion.

8. The battery connector according to claim 7, wherein a top end of the resilient portion of the first conductive contact is level with that of the retention portion.

9. The battery connector according to claim 8, wherein the retention portion of the first conductive contact comprises a retaining projection having a locking surface in a top thereof for engaging with the insulative housing.

10. The battery connector according to claim 9, wherein the first hook portion extends from a distal end of the retention portion and the second hook portion extends downwardly from one side of the first hook portion.

11. A battery connector for use with a battery, comprising:
an insulative housing having a circular base with a circular type circumferential wall extending upward from a periphery of said base so as to cooperate the base to define a battery receiving space for receiving said battery;
a conductive contact located in a notch of said circumferential wall and defining a vertical retention portion, a resilient portion horizontally extending from a top portion of the retention portion and defining upper and lower edges thereof, a hook portion located closer to a center of the battery receiving space and including a transverse engagement section for downwardly engagement with the battery and a vertical engagement section for radial engagement with the battery;
wherein the conductive contact is secured to the insulative housing by the vertical retention portion and the vertical engagement section extends downward from the horizontal engagement section.

12. The battery connector as claimed in claim 11, wherein said resilient portion further defines a spring arm extending away from the center of the battery receiving space and abutting against the circumferential wall in a radial direction of said battery receiving space.

13. The battery connector as claimed in claim 11, wherein said transverse engagement section extends horizontally.

14. The battery connector as claimed in claim 11, wherein said resilient portion further defines a spring arm extending away from the center of the battery receiving space and abutting against the circumferential wall in a radial direction of said battery receiving space.

15. A battery connector for use with a battery, comprising:
an insulative housing having a circular base with a circular type circumferential wall extending upward from a periphery of said base so as to cooperate the base to define a battery receiving space for receiving said battery;
a conductive contact located in a notch of said circumferential wall and defining a vertical retention portion, a resilient portion horizontally extending from a top portion of the retention portion and defining upper and lower edges thereof, a hook portion located closer to a center of the battery receiving space and including a transverse engagement section for downwardly engagement with the battery and a vertical engagement section for radial engagement with the battery; wherein said hook portion is linked to the resilient portion via a standing plate section having two edges respectively connected to the resilient portion and the hook portion.

16. The battery connector as claimed in claim 15, wherein said standing plate defines an upward oblique edge facing the center of the battery receiving space.

17. The battery connector as claimed in claim 15, wherein said transverse engagement section extends horizontally.

* * * * *